United States Patent

Mita et al.

[11] Patent Number: 5,582,721
[45] Date of Patent: Dec. 10, 1996

[54] APPARATUS FOR SEPARATING A LIQUID MIXTURE

[75] Inventors: Masaaki Mita; Kenji Sugimoto, both of Kitakyushu; Katashi Shioda, Hatano; Furuto Seiryo, Tokyo; Moriyoshi Kudoh, Buzen, all of Japan

[73] Assignees: Mitsubishi Chemical Corporation; Mitsubishi Kasei Engineering Company, both of Tokyo, Japan

[21] Appl. No.: 448,305

[22] Filed: May 23, 1995

Related U.S. Application Data

[62] Division of Ser. No. 201,033, Feb. 24, 1994, Pat. No. 5,556,539.

[30] Foreign Application Priority Data

| Feb. 26, 1993 | [JP] | Japan | 5-38524 |
| Feb. 26, 1993 | [JP] | Japan | 5-38525 |
| Mar. 4, 1993 | [JP] | Japan | 5-43954 |
| Mar. 10, 1993 | [JP] | Japan | 5-76270 |
| Mar. 11, 1993 | [JP] | Japan | 5-77647 |
| Mar. 11, 1993 | [JP] | Japan | 5-77648 |

[51] Int. Cl.$^6$ .............................. B01D 35/18; C02F 9/00
[52] U.S. Cl. ............... 210/181; 210/175; 210/195.2; 210/257.2; 210/86; 210/134; 34/82
[58] Field of Search ..................... 210/640, 641, 210/175, 177, 180, 181, 195.2, 257.2, 86, 134; 34/82, 443

[56] References Cited

U.S. PATENT DOCUMENTS

| 4,962,270 | 10/1990 | Feimer et al. | 210/640 |
| 4,978,430 | 12/1990 | Nakagawa et al. | 210/640 |
| 5,062,927 | 11/1991 | Stout | 210/640 |
| 5,080,794 | 1/1992 | Krug et al. | 210/640 |
| 5,151,190 | 9/1992 | Seiryo | 210/640 |
| 5,243,768 | 9/1993 | Fukao et al. | 34/22 |
| 5,300,197 | 4/1994 | Mitani et al. | 210/640 |

FOREIGN PATENT DOCUMENTS

| 3232804 | 9/1988 | Japan | 210/640 |
| 4-190833 | 7/1992 | Japan | 210/640 |
| 93/12865 | 7/1993 | WIPO | 210/640 |

OTHER PUBLICATIONS

Derwent Abstract 62–106630(A), JP, May 18, 1987.
Derwent Abstract, 5–90240(A), JP, Apr. 9, 1993.
Derwent Abstract 58–95523(A, JP, Jun. 7, 1983.
Derwent Abstract 531333(A), JP, Feb. 9, 1993.

*Primary Examiner*—Ana Fortuna
*Attorney, Agent, or Firm*—Oblon, Spivak, McClelland, Maier & Neustadt, P.C.

[57] ABSTRACT

An apparatus for separating a liquid by pervaporation, which comprises at least one pervaporation membrane module unit for purifying a liquid to be treated, a supply line connected to said pervaporation membrane module unit for supplying the liquid to be treated to the membrane module unit, a withdrawing line for withdrawing the permeated fluid from the membrane module unit and a withdrawing line for withdrawing the non-permeated liquid, wherein said supply line is provided with a pressure pump for transporting the liquid and a heater, and the final withdrawing line for the non-permeated liquid is provided with a pressure regulating valve.

8 Claims, 7 Drawing Sheets

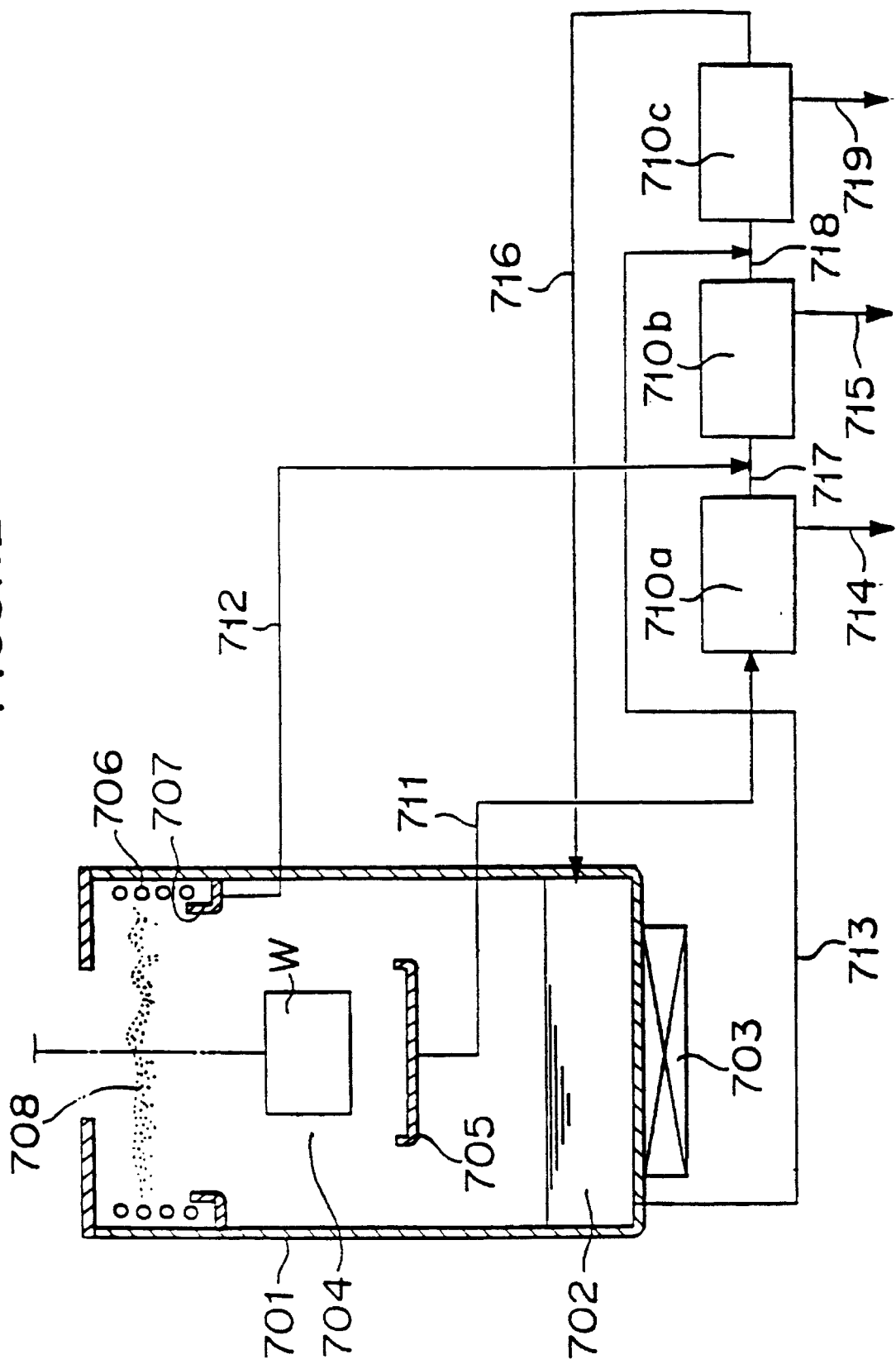

APPARATUS FOR SEPARATING A LIQUID MIXTURE

This is a Division of application Ser. No. 08/201,033 filed on Feb. 24, 1994, now U.S. Pat. No. 5,556,539

BACKGROUND OF THE INVENTION

1. FIELD OF THE INVENTION

The present invention relates to an apparatus and a method for separating a liquid mixture by pervaporation, and a vapor drying apparatus employing such a separating apparatus.

2. DISCUSSION OF BACKGROUND

As one of methods for separating liquid mixtures, so-called pervaporation is known wherein a certain specific component in a liquid mixture is separated by means of a membrane having a specific affinity to the component by placing the liquid mixture on one side (the primary side) of the membrane and vacuuming the other side (secondary side) by a vacuum pump or purging the secondary side with an inert gas so that the partial vapor pressure of the component passing through the secondary side is maintained to be lower than the equilibrium vapor pressure at the primary side.

This separation method is useful for separating a liquid mixture which can not be separated by a usual distillation method, such as an azeotropic mixture or a mixture of liquids having boiling points close to one another.

In the pervaporation method, the difference between the equilibrium vapor pressure at the primary side and the partial vapor pressure at the secondary side is desired to be as large as possible. For this purpose, it is advisable to maintain the liquid temperature on the primary side at a high level and to maintain the vacuuming degree on the secondary side at a high level. Various considerations are required in this connection.

A vapor drying apparatus may be mentioned as one of applications of such a liquid separating apparatus by pervaporation. The vapor drying apparatus is an apparatus for drying an article to be dried such as a semiconductor wafer after washing it with water. As described, for example, in Japanese Unexamined Patent Publication No. 106630/1987, the vapor drying apparatus comprises a treating tank designed to carry out drying by condensing vapor of a drying liquid comprising a water-soluble organic solvent as the main component, on the surface of the article to be dried after washing with water, and a means for purifying a condensed liquid discharged from the treating tank. In the treating tank, a section for generating the vapor of the drying liquid, a dry space section for placing the article to be dried, and a receiving section for collecting a condensed liquid below the dry space section, are provided, and the collected condensed liquid will have water removed by a purifying means and then will be returned to the treating tank.

The liquid separating apparatus by pervaporation is used as this purifying means.

In the vapor drying of e.g. a semiconductor wafer, it is necessary to maintain the solvent concentration in the drying liquid at a high level of e.g. at least 93% to prevent a defect such as a water mark. To purify the above-mentioned condensed liquid or the drying liquid having water included to such a purity level, it is preferred to provide a plurality of membrane module units and to sequentially conduct the purification depending upon the purity of the liquid to be regenerated. However, when purification is conducted by using a plurality of membrane module units, there is a problem such that depending upon the manner of supplying the liquid to be treated to each membrane module unit, the load for treatment to the membrane module unit tends to be large, and the operation efficiency tends to be low.

Further, the vapor drying apparatus is a batch system, whereby supply of the liquid to the liquid separating apparatus varies substantially, and various considerations are required to maintain the separation performance to be constant.

SUMMARY OF THE INVENTION

It is an object of the present invention to provide a liquid separating apparatus most suitable for removing water from a drying liquid for the vapor drying apparatus.

In the first aspect, the present invention provides an apparatus for separating a liquid by pervaporation, which comprises at least one pervaporation membrane module unit for purifying a liquid to be treated, a supply line connected to said pervaporation membrane module unit for supplying the liquid to be treated to the membrane module unit, a withdrawing line for withdrawing the permeated fluid from the membrane module unit and a withdrawing line for withdrawing the non-permeated liquid, wherein said supply line is provided with a pressure pump for transporting the liquid and a heater, and the final withdrawing line for the non-permeated liquid is provided with a pressure regulating valve.

When the liquid separation is conducted by the above apparatus, the equilibrium vapor pressure on the primary side of the separating membrane can be increased by exerting a pressure of from about 0.2 to 1.1 MPa (from about 1 to 10 kg/cm$^2$G), preferably from about 0.2 to 0.6 MPa (about from 1 to 5 kg/cm$^2$G), by the pressure pump and heating the liquid by the heater to a temperature of at least the boiling point under atmospheric pressure (about 0.1 MPa) and at most the boiling point under the pressure thus exerted.

BRIEF DESCRIPTION OF THE DRAWINGS

FIG. 9 is a flowchart showing still another embodiment of the vapor drying apparatus of the present invention.

DETAILED DESCRIPTION OF THE PREFERRED EMBODIMENTS

Now, the present invention will be described in detail with reference to the drawings.

Figure 1:
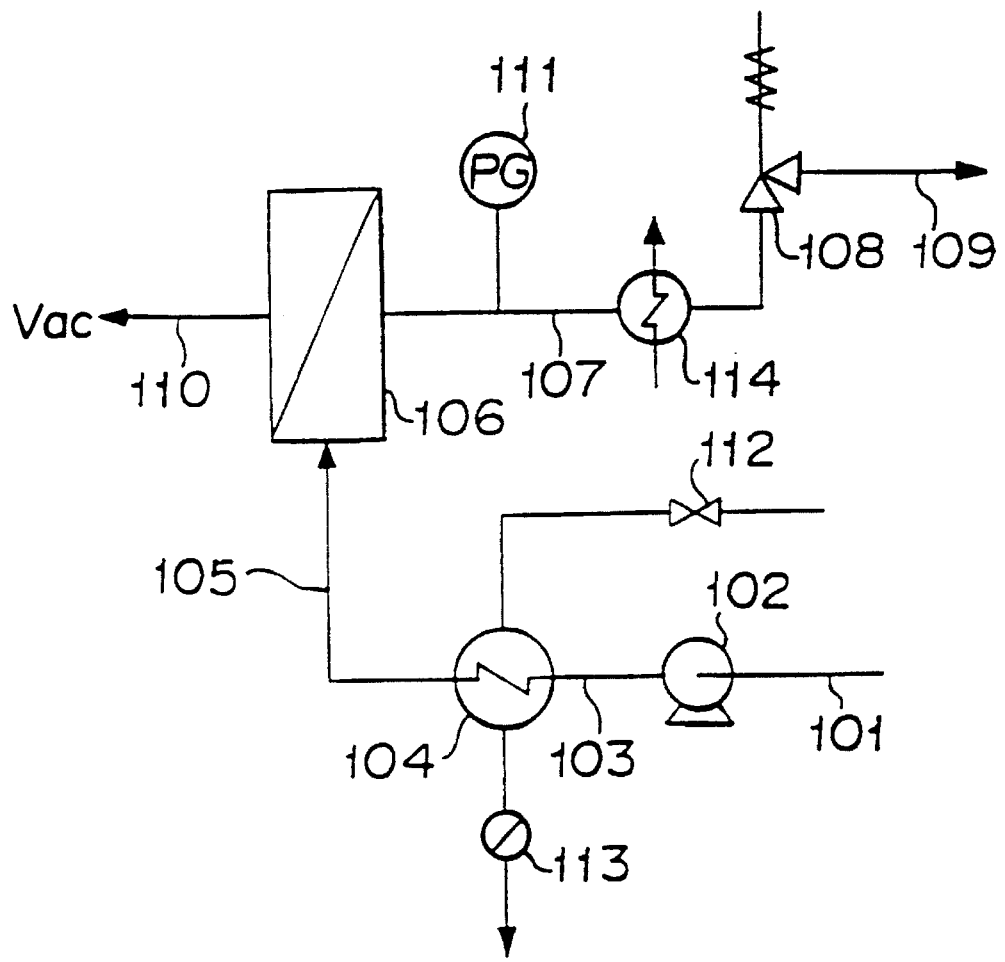
FIG. 1 is a flowchart showing an embodiment of the liquid separating apparatus of the present invention.

FIG. 1 is a flowchart showing an embodiment of the liquid separating apparatus of the present invention.

In the Figure, each of reference numerals 101, 103, 105, 107 and 109 indicates a liquid transporting line, numeral 102 a pressure pump for transporting the liquid, numeral 104 a heater, numeral 106 a pervaporation membrane module unit, numeral 108 a pressure regulating valve, numeral 110 a vacuum line, numeral 111 a pressure gage, numeral 112 a pressure regulating valve, numeral 113 a steam trap, and numeral 114 a cooler.

A liquid mixture to be treated for separation, is supplied from the line 111. The liquid mixture may be of any type, so long as it is the one to be treated for separation by pervaporation. For example, a liquid mixture of ispropyl alcohol/water, a liquid mixture of ethanol/water, a liquid mixture of benzene/methanol, or a liquid mixture of acetic acid/water, may be mentioned.

When the present invention is used for a vapor drying apparatus, an alcohol such as isopropyl alcohol (hereinafter sometimes referred to as IPA) or ethanol, is used as the drying liquid. In such a case, the liquid mixture to be treated for separation by the liquid separating apparatus will be a liquid mixture of IPA/water or a liquid mixture of ethanol/water.

The liquid mixture supplied from the line 101, is sent to the heater 104 via the line 103 by the pressure pump 102. As the pressure pump 102, a conventional reciprocating pump or a combination of a centrifugal pump and a check valve may, for example, be used. The pressure is exerted so that the pressure at the inlet of the membrane module will be from 0.2 to 1.1 MPa (from 1 to 10 kg/cm$^2$G), preferably from 0.2 to 0.6 MPa (from 1 to 5 kg/cm$^2$G). If the pressure is too low, no adequate effects of the present invention will be obtained. On the other hand, if the pressure is too high, the separating membrane or the membrane module 106 is likely to be broken. Heating by the heater 104 is conducted until the liquid temperature will be at least the boiling point of the liquid mixture under atmospheric pressure. If the liquid temperature is lower than this, no adequate effects of the present invention can be obtained. The upper limit of the liquid temperature is the boiling point under the pressure exerted. As a method for heating, electrical heating or steam heating may be employed. However, steam heating is preferred, since heat transfer at the heat transfer surface will be condensing heat transfer, whereby the overall heat transfer coefficient will be large, and the heat transfer surface can be made small. Further, when the liquid to be treated for separation is flammable, steam heating is particularly preferred, since it is free from an ignition source.

The liquid to be treated for separation, thus pressurized by the pressure pump 102 and heated by the heater 104, is supplied to the primary side of the membrane module unit 106 via the liquid transportation line 105. To the heater 104, a heating medium such as steam, is supplied from the pressure regulating valve 112 side. Reference numeral 113 is a steam trap for withdrawing the condensed heating medium.

The membrane module unit 106 may simply be a membrane module i.e. a module comprising a separating membrane and a casing, alone, but it is preferably a unit comprising a membrane module, a recycling line for recycling a part of the non-permeated liquid to the feed material side of the separating membrane, a recycling pump provided at an intermediate point of the recycling line, a heater, a feed material supply line and a non-permeated liquid withdrawing line. By providing a recycling line and a heater to the membrane module unit, it is possible to increase the amount of the liquid in contact with the separating membrane and to let the liquid to be treated have a large quantity of latent heat. (The system wherein a part or whole of the non-permeated liquid is recycled to the primary side of the membrane module unit will hereinafter be referred to simply as "recycling system".)

As the separating membrane, a conventional pervaporation membrane durable at the temperature and the pressure employed in the present invention, may be used. The separating membrane may be made of a material such as polysulfone, polyimide, polyethersulfone, polyamide or cellulose. A hydrophilic membrane capable of selectively permeating water is preferred. Particularly preferred is a hydrophilic polyimide membrane. With respect to the shape of the separating membrane, a sheet-form membrane, a spiral-form membrane or a hollow fiber membrane may, for example, be mentioned. Further, the separating membrane may be prepared by coating a substance having a separating ability on a porous substrate, as the case requires.

The secondary side of the membrane module unit 106 is vacuumed by a vacuum pump (not shown) via the line 110, whereby the component permeating through the membrane will permeate to the secondary side while being evaporated.

The residual component not permeated through the membrane will pass through the withdrawing line 107, then will be cooled by a cooler 114 to prevent abrupt vaporization, returned to atmospheric pressure by the pressure regulating valve 108 and then withdrawn from the line 109. The pressure is checked by the pressure gage 111. The pressure regulating valve 108 may be an automatic regulating valve or a back-pressure valve (a so-called relief valve).

The permeated component will be withdrawn from the line 110, then condensed by a condenser (not shown) and withdrawn out of the system.

When the above liquid separating apparatus is used as a purification means for a vapor drying apparatus, there may be a case where no adequate separation performance can be obtained by a single membrane module. In such a case, a plurality of pervaporation membrane module units may be connected so that the non-permeated liquid from the first stage pervaporation membrane module unit will be supplied to the second stage pervaporation membrane module unit, and the non-permeated liquid from the n−1 stage pervaporation membrane module unit will be supplied to the n stage pervaporation membrane module unit.

Figure 2:
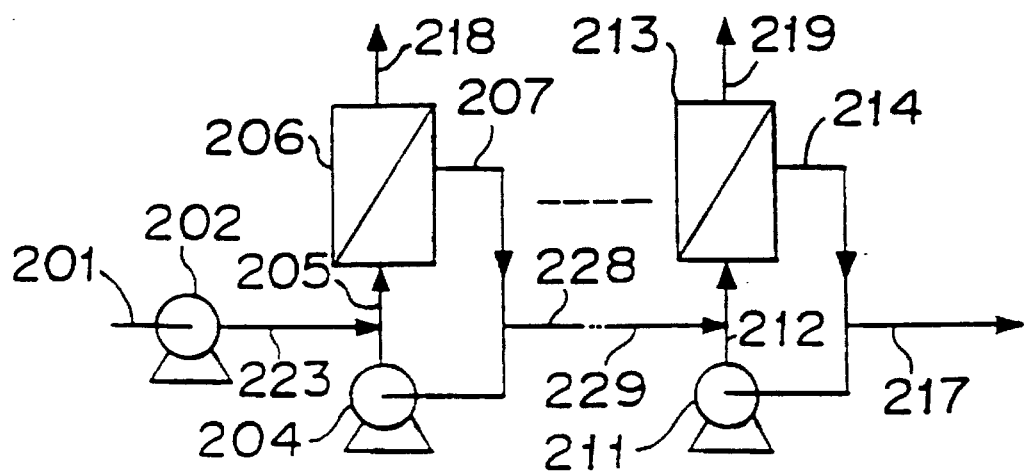
FIG. 2 is a flowchart illustrating a liquid separating apparatus which comprises a plurality of pervaporation membrane module units.

In such a case, if the units are connected as shown in FIG. 2, the pressure of each unit located on the downstream side will sequentially be lower, and there will be a limit in the number of stages of units connected in series. Namely, in the above method, the pressure of the recycling line 205 is higher than the pressure of the recycling line 207 by the ejection pressure of the recycling pump 204. In short, if at least one unit is present between the non-permeated liquid withdrawing line 228 and the feed material supply line 229 is present, the pressure in each line will decrease in the order of the line 223>the line 228>. . . >the line 229>the line 217.

Accordingly, as the number of unit stages increases, it tends to be difficult to obtain a high pressure at the final stage.

In FIG. 2, reference numeral 202 indicates a pressure pump, each of numerals 204 and 211 a recycling pump, and each of numerals 206 and 213 a membrane module unit.

Therefore, when a plurality of membrane module units are to be connected as mentioned above, it is preferred that each unit is provided with a recycling line for recycling the non-permeated liquid of that unit to the feed material side (the primary side); the recycling line is provided with a recycling pump, a heater, a feed material supply line and a non-permeated liquid withdrawing line; the feed material supply line and the non-permeated liquid withdrawing line are connected to the suction side of the recycling pump; and the non-permeated liquid withdrawing line is located on the upper stream side of the feed material supply line.

Now, such a connection system will be described with reference to FIG. 3A.

Figure 3A:
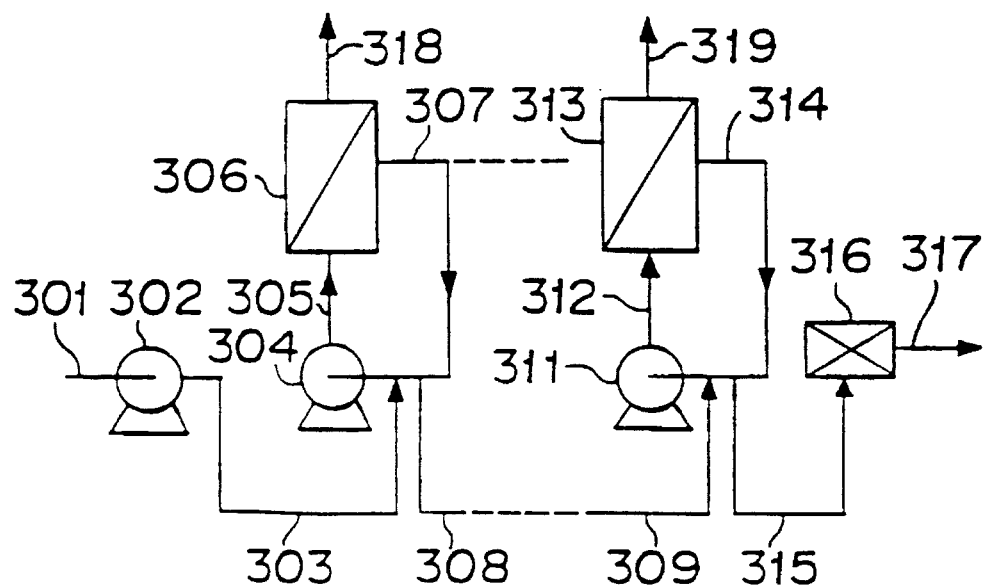
FIG. 3A is a flowchart showing an embodiment of the liquid separating apparatus of the present invention wherein a plurality of pervaporation membrane module units are advantageously connected.

In FIG. 3A, only the first stage unit and the final stage unit are shown. However, when the number of units is three or more, a unit or units similar to the first stage unit may be provided between the non-permeated liquid withdrawing line 308 and the feed material supply line 309. It is common to use the same unit for the unit of each stage, whereby the pressure loss in each unit is substantially the same.

As shown in FIG. 3A, the respective units are connected so that the non-permeated liquid of the first stage unit is supplied to the second stage unit, and the non-permeated liquid of the n−1 stage unit is supplied to the n stage unit.

The liquid to be treated, which is supplied from the feed material supply line 301, is pressurized by the pressure pump 302 and then sent to the supply line 303 of the first stage unit. The first stage membrane module unit comprises a first stage membrane module 306 and recycling lines 305 and 307 connected thereto for recycling the non-permeated liquid of that module to the feed material side (the primary side) of the module. The recycling lines are provided with a recycling pump 304, a heater (not shown), the feed material supply line 303 and a non-permeated liquid withdrawing line 308. A part of the non-permeated liquid is withdrawn by the non-permeated liquid withdrawing line 308 and supplied to the next stage unit. Such a construction is the same also in the second and subsequent stages.

The recycling pump 304 may be a conventional liquid transporting pump such as a rotary pump or a reciprocating pump. Usually, a recycling pump of the same type is used for the unit of each stage. The feed material supply line 303 and the non-permeated liquid withdrawing line 308 are connected to the suction side of the recycling pump 304 (between the non-permeated liquid withdrawing outlet of the module 306 to the suction inlet of the recycling pump 304). Further, it is important that the non-permeated liquid withdrawing line 308 is located on the upper stream side of the feed material supply line 303. Such a construction is the same also in the second and subsequent stages.

The heater (not shown) is provided to supply a heat lost as a latent heat at the time of vaporization. It may be electrical heating or steam heating. However, steam heating is preferred for a compact design, since the heat transfer surface can thereby be made small. The steam heating is preferred also in the case where the liquid mixture is flammable, since steam will not be an ignition source. The heater is located preferably at an intermediate point of the recycling line 305. If necessary, a heater may also be installed at an intermediate point of the feed material supply line 303.

The permeated component of the module 306 is withdrawn from a vacuum line 318, then condensed by a condenser (not shown) and discharged out of the system. The non-permeated liquid is sent from the recycling line 307 again to the suction inlet of the recycling pump 304. A part of the non-permeated liquid is withdrawn by the non-permeated liquid withdrawing line 308 from an intermediate point of the recycling line 307 and then sent to the feed material supply line of the second stage unit.

The second and subsequent stage units are constructed in the same manner as the first stage unit. However, the non-permeated liquid withdrawing line 315 of the final stage unit is provided with a pressure regulating valve (a dwell pressure valve) 316. The pressure of the entire system is adjusted by the pressure regulating valve 316. Of course, the pressures in the lines 303, 308, 309 and 315 are equal. The ratio of the amount of the liquid withdrawn from the non-permeated liquid withdrawing line 308 to the amount of the liquid recycled to the recycling pump 304 is usually within a range of from 1:1 to 1:200, preferably from 1:5 to 1:100.

To increase the efficiency of the liquid separating apparatus, it is desirable to reduce the vapor pressure on the secondary side.

On the other hand, at the secondary side, the permeated vapor is cooled, condensed and withdrawn out of the system. Here, when the permeated liquid is water, if the vacuuming degree on the secondary side is increased, the condensed water is likely to vaporize again. Therefore, while it is preferred to increase the vacuuming degree on the secondary side from the viewpoint of the separation efficiency, such is undesirable from the viewpoint of recovering water. Practically, the vacuuming degree has been limited to a level of 7 Tort at a cooling temperature of 2° C. In such a case, the vacuuming degree on the secondary side can be increased by lowering the freezing point by incorporating an organic solvent as an antifreezing fluid to the permeated steam and by using a low temperature refrigerant. As such an antifreezing fluid, an organic solvent compatible with water and capable of lowering the freezing point may be employed, such as ethanol, isopropyl alcohol (IPA) or ethylene glycol. Particularly when the liquid separating apparatus is used for the vapor drying apparatus, it is convenient to use the same organic solvent as the drying liquid.

The refrigerant is used usually at a temperature of from 0° to −20° C. Such a refrigerant may suitably be selected from conventional refrigerants taking into the cooling temperature into consideration. Specifically, an organic compound such as methanol, ethanol, ethylene glycol or IPA may, for example, be mentioned.

As a means for incorporating a compatible organic solvent to the permeated steam, an apparatus for adding the organic solvent may be provided to the piping extending from the secondary side of the membrane to the heat transfer surface of the heat exchanger, or the separation ratio of the separating membrane may be reduced so that the organic solvent in the feed liquid mixture may partially be permeated therethrough. The former method is preferred, since control of the freezing point is thereby easy. When IPA is used as the organic solvent, and the refrigerant temperature is from 0° to −10° C., the amount of IPA incorporated to the steam on the secondary side is usually from 5 to 30 wt %.

When the organic solvent to be added to the permeated vapor is the same as the organic solvent in the feed liquid mixture, a part of the condensed liquid of the permeated fluid after addition of the organic solvent, may be returned to the feed liquid mixture to recover the organic solvent.

The method of returning a part of the condensed liquid to the feed material is effective for reducing the load of the waste water treating system, when the permeated fluid (the liquid mixture composed mainly of water) is to be disposed.

Further, when a plurality of separating membranes are connected in series, it is preferred that the refrigerant temperature of the condensing system of at least the first stage pervaporation membrane module unit is adjusted to be at least 0° C., and an organic solvent is incorporated to the permeated liquid of at least one of the second and subsequent stage pervaporation membrane module units and the refrigerant temperature of the condensing system here is adjusted to be at most 0° C. Namely, in the first stage pervaporation membrane module unit, the supplied liquid mixture has a large water content, and the vapor pressure of water at the primary side is high, whereby the pressure at the secondary side is not required to be reduced so much, and the amount of permeated water is substantial, whereby the amount of an antifreezing fluid required will be substantial. The water content in the liquid mixture supplied to the separating membrane tends to be small towards the later stage of the unit, whereby the vapor pressure of water at the primary side will be low, and the amount of permeated water tends to be small. Therefore, the above method will be most suitable.

Here, "a plurality of separating membranes are connected in series" means a connecting method such that the non-permeated liquid of the first stage pervaporation membrane module unit is supplied to the second stage pervaporation membrane module unit, and the non-permeated liquid of the n−1 stage pervaporation membrane module unit is supplied to the n stage pervaporation membrane module unit.

It is the second or subsequent stage pervaporation membrane module unit, to the permeated vapor of which an organic solvent is incorporated. Such incorporation of the organic solvent is optionally determined taking into consideration the water content of the liquid mixture supplied to the particular pervaporation membrane module unit. Further, in such a case, a part or whole of the condensed liquid having an inorganic solvent incorporated as an antifreezing fluid, is preferably returned to the feed material.

Such an embodiment will be described in further detail with reference to FIG. 3B.

Figure 3B:
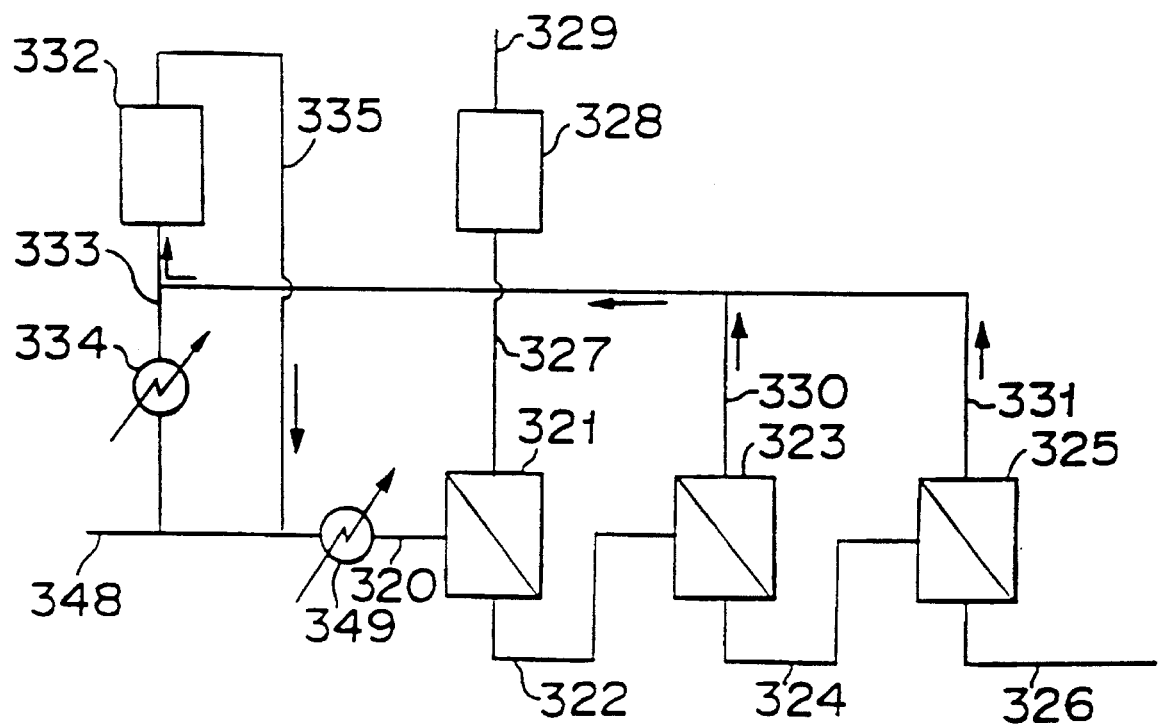
FIG. 3B is a flowchart showing another embodiment of the liquid separating apparatus of the present invention wherein three pervaporation membrane module units are connected.

FIG. 3B shows an embodiment wherein three stages of pervaporation membrane module units are connected, wherein the refrigerant temperatures in the condensing systems for permeated vapors in the second and third stage pervaporation membrane module units are adjusted to be at most 0° C.

In FIG. 3B, reference numeral 349 indicates a heater, numeral 321 a first stage pervaporation membrane module unit, numeral 323 a second stage pervaporation membrane module unit, numeral 325 a third stage pervaporation membrane module unit, numeral 328 a first condenser (the refrigerant temperature is at least 0° C.), numeral 332 a second condenser (the refrigerant temperature is at most 0° C.), and numeral 334 a preliminary cooler for an organic solvent (antifreezing fluid).

The liquid mixture supplied from the feed material pipe line 348 is sent to the heater 349 via a pump (not shown). The liquid mixture is heated to a necessary temperature by the heater 349 and then supplied to the primary side of the first pervaporation membrane module unit 321 via the line 320. The non-permeated liquid from the first pervaporation membrane module unit 321 is heated by a heater (not shown) as the case requires and supplied to the second stage pervaporation membrane module unit 323. Likewise, the non-permeated liquid from the second stage pervaporation membrane module unit 323 is supplied to the third stage pervaporation membrane module unit 325.

The permeated vapor of the first stage pervaporation membrane module unit 321 is supplied to the first condenser 328 without addition of an antifreezing fluid. At the first condenser 328, the refrigerant temperature is adjusted to be at least 0° C., for example, from 2° to 10° C. (In FIG. 3B, the piping for the refrigerant and the piping for the vacuum system are omitted.)

The permeated vapors from the second stage pervaporation membrane module unit 323 and the third stage pervaporation membrane module unit 325 are mixed with the feed liquid mixture from a line 333 and then supplied to the second condenser 332. In the second condenser 332, the refrigerant temperature is adjusted to be at most 0° C., for example, from −5° to −10° C. The liquid condensed by the second condenser 332 is returned to the feed material via a line 35.

As shown in FIG. 3B, a single condenser may be used commonly for a plurality of vapors to be cooled at the same refrigerant temperature.

Further, in order to increase the efficiency of the above condenser, it is advisable to spray a part of the permeated liquid condensed and liquefied on the heat transfer surface of the above condenser. Namely, the gas permeated through the separating membrane is condensed and liquefied by a heat exchanger to transfer a heat by a heat transfer surface, and a part of the condensed liquid is recycled and sprayed in a liquid state over the heat transfer surface, so that the heat transfer surface will be wet with the liquid of the permeated component to have a thin heat transfer layer, whereby the overall heat transfer coefficient of the heat exchanger will increase. As a result, it is possible to reduce the heat transfer area required for condensing the permeated gas, whereby it is possible to reduce the overall size of the liquid separating apparatus.

Figure 4:
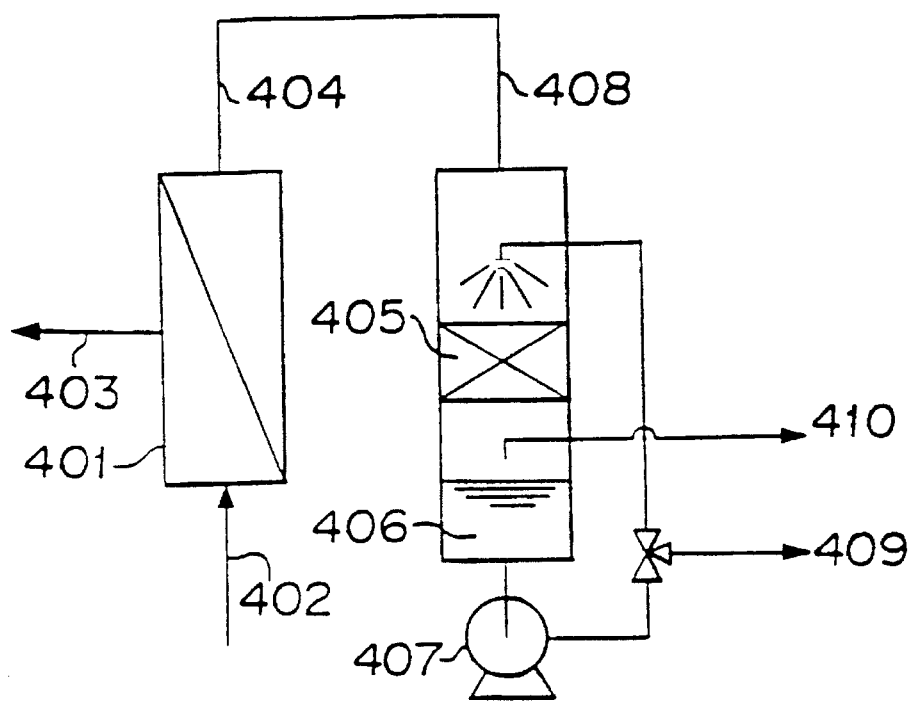
FIG. 4 is a flowchart showing an embodiment of the condensing system used in the present invention.

Now, a specific embodiment will be described with reference to FIG. 4. FIG. 4 is a diagrammatical view showing an embodiment of the above condensing system. In the Figure, reference numeral 401 indicates a pervaporation membrane module, numeral 405 a heat exchanger, and numeral 407 a recycling pump. The feed material liquid to be separated is supplied by a line 402 to the primary side of the membrane module 401. The non-permeated fluid not permeated through the pervaporation membrane flows into a line 403.

The secondary side of the membrane module 401 is vacuumed by a line 410 via a line 404 and via the heat exchanger 405. The component permeating through the pervaporation membrane will permeate through the membrane by the difference in the vapor pressure between the primary side and the secondary side and will reach the heat exchanger 405 via the line 404. The heat transfer surface of the heat exchanger 405 is wet with a condensed liquid Of the permeated component sprayed from the line 408, whereby the permeated vapor supplied from the line 404 is efficiently condensed. The forward end of the line 408 is preferably in the form of a sprayer capable of spraying the condensed liquid over the entire surface of the heat exchanger 405.

The permeated component condensed by the heat exchanger 405 is temporarily retained in the condensed liquid tank 406. A part of the condensed liquid is recycled by a pump 407 to the heat exchanger 405 via the line 408, and a part or whole amount is intermittently or continuously withdrawn out of the system from the line 409.

The line 410 is connected to a vacuum pump not shown, so that the secondary side of the membrane is maintained to be a reduced pressure state. The end of the line 410 on the condensed liquid tank 406 side is preferably open downwardly or sideways so that the condensed liquid will not enter into the line 410.

The condensed liquid tank 406 preferably has a double jacket structure along its outside, so that the outside of the condensed liquid tank 406 is cooled by a refrigerant, since the interior of the condensed liquid tank 46 is maintained to be a reduced pressure state by the line 410, and the condensed liquid is likely to vaporize again when the temperature rises.

The flow rate of the condensed liquid recycled to the heat exchanger 405 by the line 408 is from 1 to 50 l/min, preferably from 5 to 20 l/min, per $m^2$ of the heat transfer surface. If the flow rate is smaller than this range, the effects by recycling the condensed liquid will be small. On the other hand, if the flow rate is higher than the above range, the efficiency of the heat exchanger 405 will not substantially be improved, and the load of the pump 407 will increase, such being undesirable.

When the liquid separating apparatus is used for the vapor drying apparatus, the vapor drying apparatus is operated in a batch system, while the liquid separating apparatus is operated in a continuous system. Therefore, to stabilize the operation of the liquid separating apparatus, it has been common to employ a large feed material tank as a buffer. However, the operation can be stabilized with a small feed material tank by a construction such that a feed material tank is provided for preliminarily storing the liquid to be treated; a line for returning the non-permeated liquid to the feed material tank is connected via a switchover valve to an intermediate point of the non-permeated liquid withdrawing line; the feed material tank is equipped with a feed material tank liquid level detector for detecting the liquid level of the liquid to be treated; and a control means is provided for opening the switchover valve to the line for returning the non-permeated liquid to the feed material tank when the liquid level in the feed material tank becomes lower than a predetermined level, or opening the switchover valve to the non-permeated liquid withdrawing line when the liquid level becomes higher than the predetermined level, depending upon the input signal from the feed material tank liquid level detector.

Further, when the liquid separating apparatus employs a pervaporation and distillation, the construction may be such that a feed material tank for preliminarily storing the liquid to be treated and a distillation still for distilling the non-permeated liquid, are provided; connected via a switchover valve to an intermediate point of the line for transporting the liquid from the pervaporation membrane module unit to the distillation still, is a line for returning the non-permeated liquid to the feed material tank; a line for withdrawing the distilled liquid is provided with an on-off valve; the feed material tank is equipped with a feed material tank liquid level detector for detecting the liquid level of the liquid to be treated; the distillation still is equipped with a distillation still liquid level detector for detecting the liquid level of the liquid to be distilled; a control means for opening the switchover valve to the line for returning the non-permeated liquid to the feed material tank when the liquid level in the feed material tank becomes lower than a predetermined level, or opening the switchover valve to the line for transporting the liquid to the distillation still when the liquid level becomes higher than the predetermined level, depending upon the input signal from the feed material tank liquid level detector, is provided; and a control means for closing the on-off valve when the liquid level of the liquid to be distilled in the distillation still becomes lower than a predetermined level, or opening the on-off valve when the liquid level becomes higher than the predetermined level, depending upon the input signal from the distillation still liquid level detector, is provided.

The control means for opening the switchover valve to the line to the feed material tank when the liquid level of the feed material tank becomes lower than the predetermined level, based on the input signal from the feed material tank liquid level detector, makes the continuous operation of the membrane module unit possible by returning the liquid purified by the membrane module unit to the starting material tank via the line to the feed material tank and thereby preventing a decrease of the liquid to be treated in the feed material tank.

Further, the control means for closing the on-off valve when the liquid level in the distillation still becomes lower than the predetermined level, based on the input signal from the distillation still liquid level detector, makes the continuous operation of the membrane module unit and the distillation still possible by regulating the distilled liquid withdrawing line to reflux the entire amount of the distilled liquid in the distillation still and thereby preventing a decrease of the liquid to be treated in the distillation still.

The above modes of operation will be described with reference to FIGS. 5 and 6.

Figure 5:
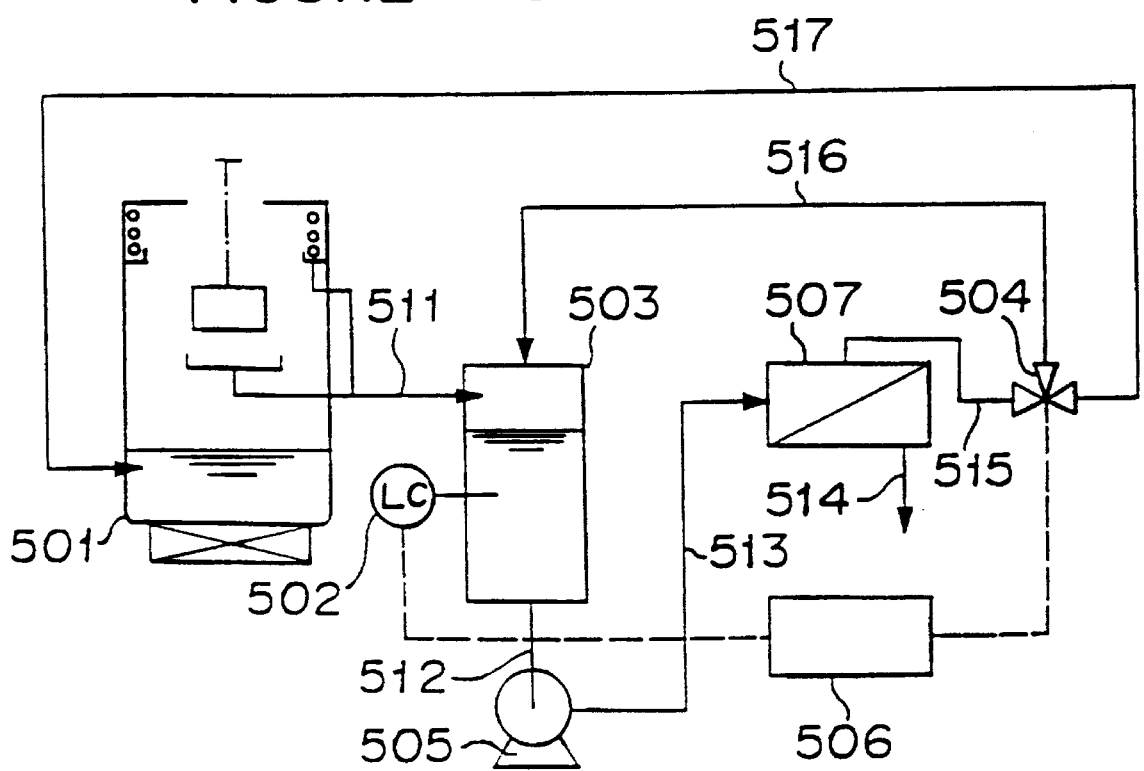
FIG. 5 is a flowchart showing an embodiment of the liquid purification apparatus of the present invention.
Figure 6:
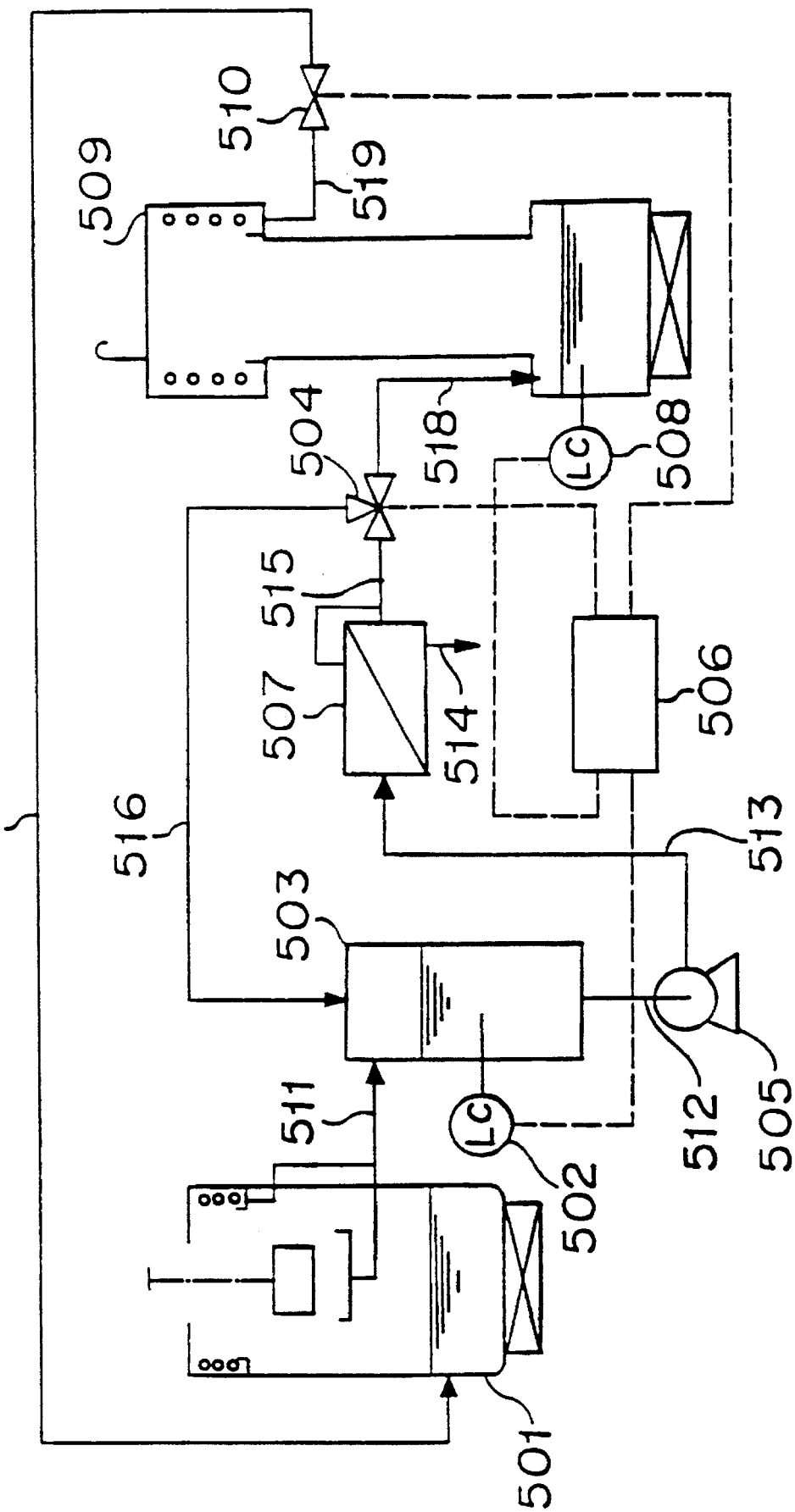
FIG. 6 is a flowchart showing another embodiment of the liquid purification apparatus of the present invention.

FIG. 5 is a flowchart showing an embodiment of the liquid purifying apparatus of the present invention, and FIG. 6 is a flowchart showing another embodiment of the liquid purifying apparatus of the present invention. In FIGS. 5 and 6, the same portions are represented by the same reference numerals. The following description will be made with respect to a case where the liquid to be treated is isopropyl alcohol (IPA) containing water.

As shown in FIG. 5, the liquid purifying apparatus of the present invention comprises a feed material tank 503 for storing the liquid to be treated, a membrane module unit 507 for purifying the liquid to be treated, lines 512 and 513 for connecting the feed material tank and the membrane module unit, and non-permeated liquid withdrawing lines 515 and 517 connected to the membrane module unit 507. Connected via a switchover valve 504 to an intermediate point of the withdrawing lines 515 and 517 is a line 516 for returning the non-permeated liquid to the feed material tank 503. The feed material tank 503 is equipped with a feed material tank liquid level detector for detecting the liquid level of the liquid to be treated, and a control means 506 is provided for opening the switchover valve 504 to the line 516 to the feed material tank when the liquid level in the feed material tank 503 becomes lower than a predetermined level, or opening the switchover valve 504 to the withdrawing line 517 when the liquid level becomes higher than the predetermined level, depending upon the input signal from the feed material tank liquid level detector 502.

Connected to the feed material tank 503 is a line 511 for introducing the liquid to be treated (IPA containing water) from a feed material generating source such as a vapor drying apparatus 501. In the liquid purifying apparatus of the present invention, the feed material tank 503 serves as a so-called buffer at the time of recycling IPA and is air-tightly constructed with a view to safety and prevention of evaporation loss of IPA. the capacity of the feed material tank 503 is selected to be a suitable capacity to secure a sufficient amount of IPA recycled between the feed material tank and the membrane module unit 507.

On the other hand, between the above feed material tank 503 and the membrane module unit 507, a pump 505 for transporting IPA to the membrane module unit is provided. The bottom of the feed material tank 503 and the suction side of the pump 505 are connected by a line 512, and the ejection side of the pump 505 and the primary side of the membrane module unit 507 are connected by a line 513. Further, the lines 515 and 517 for withdrawing the non-permeated liquid are provided at the outlet side of the membrane module unit 507. Further, a discharge line 514 for discharging the permeated water is provided at the secondary side of the membrane module unit 507. The discharge line 514 is connected to the above described condenser not shown.

Connected via a switchover valve 504 to the withdrawing lines 515 and 517 is a line 516 for returning the non-permeated liquid to the feed material tank 503. As such a switchover valve 504, it is common to employ a three-way air-actuated valve or explosion-proof solenoid valve. The non-permeated liquid withdrawn by the line 515 may be supplied again to the vapor drying apparatus 501 as the feed material generating source, or may be introduced into the line 517 for withdrawal out of the system, or may be introduced into the line 516 for returning to the feed material tank 503, by the switchover valve 504.

On the other hand, the feed material tank liquid level detector 502 is provided to detect the liquid level of IPA in the feed material tank 503, and it may be constituted by various types of liquid level meters such as a supersonic liquid level meter having a transmitter and receiver located above the liquid surface or in the liquid, a pressure detecting type liquid level sensor, a pressure difference type or float-type liquid level meter.

The control means 506 is designed to determine whether or not the liquid level in the feed material tank 503 is less than the predetermined level, based on the input signal from the above feed material tank liquid level detector 502, and when it determines that the liquid level is lower than the predetermined level, the switchover valve 504 is opened to the line 516 to the feed material tank 503, and when it determines that the liquid level is higher than the predetermined level, the switchover valve 504 is opened to the withdrawing line 517. Such a control means 506 may be installed in a control apparatus such as a so-called program controller which is commonly used for controlling the entire apparatus.

Now, the operation of the liquid purification apparatus of the present invention will be described with reference to a case where the above solvent used in the vapor drying apparatus 501 is regenerated.

The vapor drying apparatus 501 has a treating tank for carrying out drying by condensing e.g. IPA vapor on the surface of an article to be dried after washing with water. The treating tank is provided, in its interior, with a section for generating vapor of IPA, a dry space section for placing the article to be dried, a receiving section for collecting a condensed liquid below the dry space section, a cooling coil for condensing the vapor of a drying liquid above the dry space section and a receiving section for collecting a condensed liquid below the cooling coil.

The condensed liquid (IPA containing water) formed in the above vapor drying apparatus 501 is introduced into the feed material tank 503 via a line 511. In the feed material tank 503, a suitable amount of IPA as the liquid to be treated is usually stored. IPA in the feed material tank 503 is suctioned by the pump 505 via the line 512 and then sent to the membrane module unit 507 via the line 513 by the pump.

In the membrane module unit 507, when the liquid mixture of water and IPA is introduced into the primary side of hollow fiber membranes, the secondary side is vacuumed, so that the partial vapor pressure of water on the secondary side is maintained to be lower than the equilibrium vapor pressure at the primary side, whereby water is selectively permeated for separation in the form of a gas to the secondary side of the hollow fiber membranes by pervaporation and IPA is purified to a high concentration. The purified IPA as the non-permeated liquid is introduced into the line 515 and then returned to the vapor drying apparatus 501 via the line 517 for reuse. Further, the water separated by the membrane module unit 507 is condensed at an intermediate point of the line 514 and discharged.

When the treatment is discontinued in the vapor drying apparatus 501 (the feed material generating source), the liquid to be treated will not be introduced through the line 511, whereupon the liquid level of the feed material tank 503 lowers. The liquid level of the feed material tank 503 is detected by the feed material tank liquid level detector 502 provided on the feed material tank, and the detected signal is input into the control means 506. The control means 506 always determines whether or not the liquid level in the feed material tank 503 is at a predetermined level, and if it determines that the liquid level is lower than the predetermined level, it actuates the switchover valve 504 to open to the line 516 to the feed material tank 503. When the switchover valve 504 is switched to the line 516, IPA so far returned to the vapor drying apparatus 501 via the line 517, will then be returned to the feed material tank 503 again via the line 516. Accordingly, in the feed material tank 503, a decrease of the liquid to be treated beyond the predetermined liquid level will be prevented, so that the membrane module unit 507 can be continuously operated without interruption.

Namely, the operation can be conducted continuously even when supply of IPA to be treated is stopped for various reasons, whereby a stabilized purification function can be maintained without bringing about a decrease in the separation performance of the membrane module unit 507. Yet, between the feed material tank 503 and the membrane module unit 507, the recycling and purification of the liquid to be treated is repeated, whereby when the supply is resumed, the operation can swiftly be adjusted accordingly. By such a recycling operation, it is unnecessary to maintain a large amount of IPA in the system, and it is possible to reduce the size of the feed material tank 506, whereby the installation cost can be reduced. Further, IPA is always present in the feed material tank 503, whereby unloaded operation of the pump 505 can be avoided even when the supply from the feed material generating source is stopped by e.g. a trouble of the process.

When the liquid to be treated is introduced again via the line 511 and the liquid level in the feed material tank 503 becomes higher than the predetermined liquid level, the control means 506 determines whether or not the liquid level in the feed material tank 503 is higher than the predetermined level, based on the detection signal from the feed material tank liquid level detector 502, and when it determines that the liquid level is higher than the predetermined level, it actuates the switchover valve to open to the withdrawing line 517. Then, the purified IPA is returned to the vapor drying apparatus 501 via the line 517.

Now, another embodiment of the liquid purification apparatus will be described with reference to FIG. 6.

The liquid purification apparatus of this embodiment comprises a feed material tank 503 for storing the liquid to be treated, a membrane module unit 507 for purifying the liquid to be treated, a distillation still 509 for distilling the purified liquid, lines 512, 513, 515 and 518 for connecting them sequentially, and a distilled liquid withdrawing line 519 connected to the distillation still 509. Connected via a switchover valve 504 to the line 515 extending from the membrane module unit 507 to the distillation still, is a line 516 for returning the purified liquid to the feed material tank 503, and the withdrawing line 519 is provided with an on-off valve 510. Further, the feed material tank 503 is equipped with a feed material tank liquid level detector 502 for detecting the liquid level of the liquid to be treated, and the distillation still 509 is equipped with a distillation still liquid level detector 508 for detecting the liquid level of the purified liquid to be distilled.

A control means 506 is provided which has a function of opening the switchover valve 504 to the line 516 to the feed material tank when the liquid level in the feed material tank 503 becomes lower than a predetermined level, or opening the switchover valve 504 to the line 518 to the distillation still when the liquid level becomes higher than the predetermined level, based on the input signal from the feed material tank liquid level detector 502, and a function of closing the on-off valve 510 when the liquid level in the distillation still 509 becomes lower than a predetermined level, or opening the on-off valve 510 when the liquid level becomes higher than the predetermined level, based on the input signal from the distillation still liquid level detector 508.

Namely, in this embodiment of the present invention, as is different from the previous embodiment, the distillation still 509 is provided as a subsequent stage of the membrane module unit 507, and IPA purified in the membrane module unit 507 is introduced via the line 518 to the distillation still 509, and the distilled liquid (IPA) obtained in the distillation still 509 is returned to the feed material generating source such as the vapor drying apparatus 501 via the line 519, the on-off valve 510 and the line 520. Yet, the distillation still 509 is equipped with the distillation still liquid level detector 508, and the control means 506 is provided with a function of operating the on-off valve 510 based on the input signal from the distillation still liquid level detector 508. Other constructions are the same as in the previous embodiment.

The above distillation still 509 is provided to remove particles from the purified IPA. Such a distillation still 509 is a so-called single-tower type distillation apparatus, and at a lower portion thereof, a vapor generating section which stores the purified liquid and which is capable of generating the vapor by means of a suitable heating means such as a heater, is provided, and at its upper portion, a condensing coil for liquefying the generated vapor, is provided.

The distillation still liquid level detector 508 is provided at the above-mentioned vapor generating section of the distillation still 509, and it is constituted by various liquid level meters in the same manner as described above with respect to the feed material tank liquid level detector 502. As the on-off valve 510, an automatic valve such as an air-actuated valve or explosion-proof solenoid valve may be used in the same manner as the above described switchover valve 504.

When the distillation still 509 is provided as described above, in a usual operation, IPA purified by the membrane module unit 507 is supplied to the distillation still 590 via the line 515, the switchover valve 504 and the line 518. The supplied IPA is distilled in the distillation still 509 and withdrawn via the line 519 as a distilled liquid containing no particles. Then, it is returned to the vapor drying apparatus 501 via the line 520 for reuse.

As described above, when the liquid level in the feed material tank 503 becomes low, the switchover valve 504 at the downstream side of the membrane module unit 507 is switched by the control means 506, so that the purified IPA is returned to the feed material tank 503 and recycled between the feed material tank and the membrane module unit 507. In such a case, supply of the purified liquid is stopped to the line 518 on the downstream side of the switchover valve 509, whereby the purified IPA stored in the distillation still 509 will gradually decrease.

The liquid level in the distillation still 509 is detected by the distillation still liquid level detector 508. Based on the detection signal from the detector 508, the control means 506 continuously determines whether or not the liquid level in the distillation still 509 is lower than the predetermined level. If it determines that the liquid level is lower than the predetermined level, it closes the on-off valve 510 to stop the flow out of the distilled liquid from the line 519. When the on-off valve 510 is closed, in the distillation still 509, the entire amount of the distilled IPA is returned to the purified liquid side stored in the vapor generating section. Accordingly, in the distillation still 509, a decrease of the purified liquid beyond the predetermined liquid level can be prevented, and unloaded operation of the distillation still can be prevented, and the operation can be conducted continuously. Further, it can be operated continuously together with the membrane module unit 507, whereby when the supply to the feed material tank 503 is resumed, the distilled liquid can be supplied swiftly. Further, in the same manner as in the previous embodiment, a stabilized distillation performance can be maintained, and it is unnecessary to maintain a large amount of IPA in the feed material tank 503.

When the purified liquid is supplied again to the distillation still 509 via the line 518, and the liquid level in the distillation still 509 has reached a predetermined level, the control means 506 determines whether or not the liquid level in the distillation still 590 is higher than the predetermined level, based on the detection signal from the distillation still liquid level detector 508, and when it determines that the liquid level is higher than the predetermined level, it opens the on-off valve 510, whereupon the distilled liquid is supplied to the vapor drying apparatus 501 via the line 520.

In FIGS. 5 and 6, both the liquid condensed on the article to be dried and the liquid condensed at the cooling coil in the vapor drying apparatus are introduced into the feed material tank 503. However, to conduct the liquid separation more efficiently, it is advisable to introduce them at different positions in the multi stages of the pervaporation membrane module units. Namely, preferred is a vapor drying apparatus wherein the treating tank is provided, in its interior, with a section for generating vapor of a drying liquid, a dry space section for placing the article to be dried and a receiving section for collecting a condensed liquid below the dry space section; the first membrane module unit is provided with a line for introducing the condensed liquid of the above receiving section; the membrane module unit located at the downstream side of the first membrane module unit, is provided with a line for introducing a part of the drying liquid from the above vapor generating section; and a line for introducing the non-permeated liquid to the vapor generating section is provided at the non-permeated liquid outlet side of the final membrane module unit. Otherwise, preferred is a vapor drying apparatus in which the treating tank is provided, in its interior, with a section for generating vapor of a drying liquid, a dry space section for placing the article to be dried, a first receiving section for collecting a condensed liquid below the dry space section, a cooling coil for condensing the vapor of the drying liquid above the dry space section and a second receiving section for collecting a condensed liquid below the cooling coil; the first membrane module is provided with a line for introducing the condensed liquid from the first receiving section; the membrane module located at the downstream side of the first membrane module is provided with a line for introducing the condensed liquid of the second receiving section; and a line for introducing the non-permeated liquid to the vapor generating section is provided at the outlet side of the final membrane module.

Embodiments of such vapor drying apparatus will be described in detail with reference to FIGS. 7 to 9.

Figure 7:
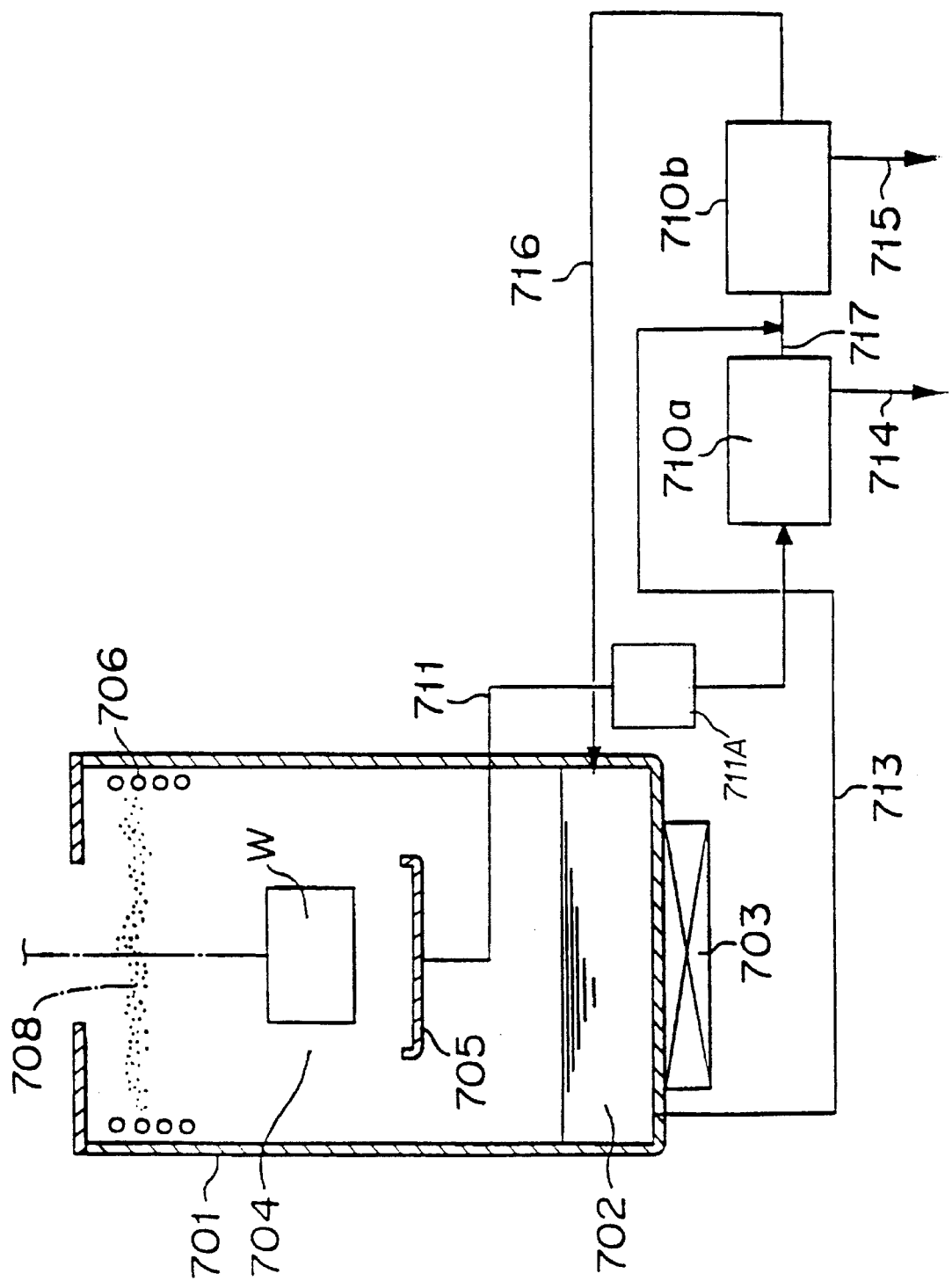
FIG. 7 is a flowchart showing an embodiment of the vapor drying apparatus of the present invention.
Figure 8:
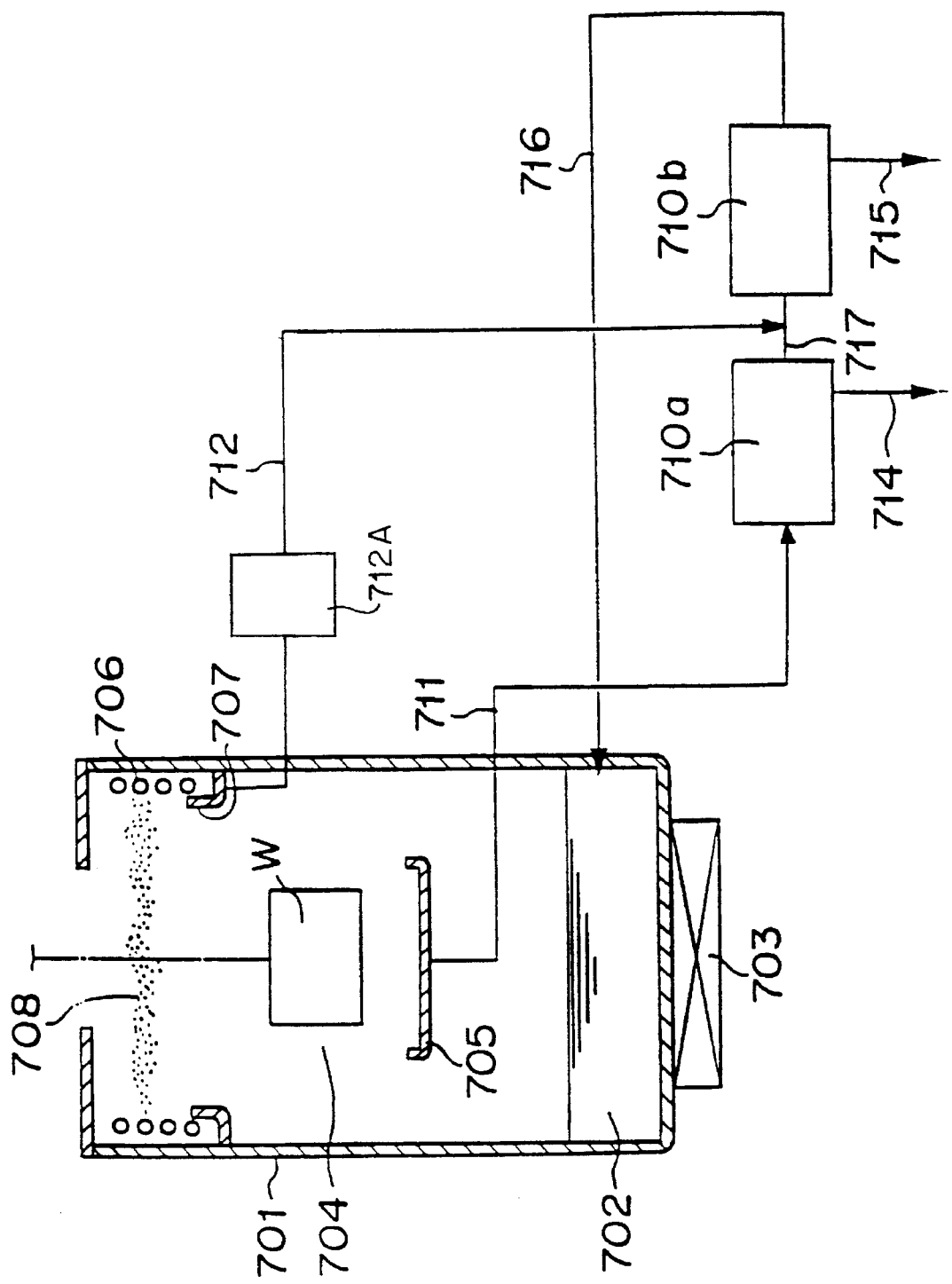
FIG. 8 is a flowchart showing another embodiment of the vapor drying apparatus of the present invention.

FIG. 7 is a flowchart showing an embodiment of the vapor drying apparatus of the present invention, FIG. 8 is a flowchart showing another embodiment of the vapor drying apparatus of the present invention, and FIG. 9 is a flowchart showing still another embodiment of the vapor drying apparatus of the present invention. In FIGS. 7 to 9, the same portions are represented by the same reference numerals.

As shown in FIG. 7, the vapor drying apparatus of the present invention comprises mainly a treating tank 701 for carrying out drying by condensing vapor of a drying liquid comprising an organic solvent as the main component, on the surface of the article to be dried (W) after washing with water and a plurality of membrane modules 710a and 710b constituted by membranes which selectively permeate water. The treating tank 701 is provided, in its interior, with a section 702 for generating vapor of a drying liquid, a dry space section 704 for placing the article to be dried (W) and a receiving section 705 for collecting a condensed liquid below the dry space section.

In the present invention, with the above construction, the first membrane module unit 710a is provided with a line 711 for introducing the condensed liquid from the receiving section 705 via a feed material tank the membrane module unit 710b located at the downstream side of the first membrane module unit 710a is provided with a line 713 for introducing a part of the drying liquid from the vapor generating section 702; and the final membrane module unit 710b is provided with a line 716 for introducing the non-permeated liquid to the vapor generating section 702. With such a construction, it is possible to minimize the treating load in the respective membrane module units 710a and 710b.

The vapor generating section 702 is provided with a heating means in the vicinity of the bottom of the treating tank 701 where IPA is stored. As such a heating means, a heater 703 of the type capable of generating a sufficient quantity of heat to evaporate IPA is employed, and it is usually attached at the bottom outside the treating tank 701 in consideration of safety. As the vapor generating section 702, a vapor generating apparatus employing supersonic vibration can be employed, and in such a case, it is possible to supply vapor from a position other than the surface of stored IPA, for example, from the side wall of the treating tank 701.

The article to be dried (W) is, for example, a semiconductor substrate such as a wafer or a precision optical part, and it is placed at the dry space section 704 provided at an upper portion in the treating tank 701. At the dry space section 704, the article to be dried (W) is usually hung from above as accommodated in a holding means such as a work cassette (not shown) capable of holding the article with its surface to be treated exposed.

The receiving section 705 is provided between the article to be dried (W) hung at the dry space section 704 and the liquid surface of the stored IPA at a suitable height so as not to contact either the article or the liquid surface. Such a receiving section 705 is in the form of a substantially flat plate-like receiving dish to collect the drying liquid condensed on and dropping from the surface of the article to be washed (W), and an opening is provided at its center, so that the opening will constitute an inlet to the above line 711.

Further, above the dry space section 704, a cooling coil 706 for condensing the generated IPA vapor is usually provided to prevent a loss of IPA. Such a cooling coil 706 is constructed so that cooling water or a refrigerant gas will be circulated, and it has a function of liquefying the IPA vapor and recycling it. Further, from the membrane modules 710a and 710b, a small amount of IPA will be discharged together with separated water out of the system. Therefore, the treating tank 701 is provided with an IPA supplying tube (not shown), so that fresh IPA can be appropriately supplemented as the liquid level lowers. The respective membrane module units 710a and 710b with the above described construction are connected by a line 717. To the first membrane module unit 710a, IPA (condensed liquid) having a high water concentration is introduced. Therefore, the condensed liquid is supplied from the receiving section 705 of the treating tank 701 to a feed material tank not shown, and the line 711 is connected which extends from the feed material tank to the supply line of the membrane module unit. Further, to the non-permeated liquid withdrawing line of the membrane module unit 710a, a discharge line 714 for discharging permeated water out of the system, is connected.

Further, in order to maintain IPA in the vapor generating section 702 at a predetermined concentration, a line 713 for introducing a part of IPA is connected from the bottom of the vapor generating section 702 to the line 717 connecting the membrane module unit 710a and the membrane module unit 710b. Then, to the non-permeated liquid outlet side of the membrane module unit 710b, a line 716 for returning purified IPA to the vapor generating section 702, is connected. Further, although not shown, a recycling line to the feed material tank may be provided together with the above described switchover valve and the control means. To the secondary side of the membrane module unit 710b, a discharge line 715 is connected to discharge permeated water out of the system. Now, the operation of the vapor drying apparatus of the present invention will be described.

The article to be dried (W) having moisture attached, is suspended at the dry space section 704 of the treating tank 701. In the treating tank 701, IPA is stored in the vapor generating section 702, and the IPA vapor is filled in the dry space section 704. The IPA vapor has high affinity to water and thus will take in the water attached to the article to be dried (W) and condense on the surface of the article to be dried (W). The dropped condensed liquid i.e. the mixture of water and IPA will be collected by the receiving section 705 and introduced into the line 711 via a feed material tank 711A.

The condensed liquid having high water concentration is pressurized by a pressure pump (not shown) and heated by a heater (not shown) provided on the line 711 and then sent to a supply line of the membrane module unit 710a. In the membrane module unit 710a, pervaporation is accelerated by the difference between the water partial pressure at the primary side and the water partial pressure at the secondary side, and water is selectively permeated, whereby IPA is purified to have a low water concentration and sent to a supply line of the membrane module unit 710b on the downstream side.

On the other hand, in the treating tank 701, the IPA vapor is condensed by the cooling coil 706 disposed at an upper portion, to form a condensed layer 708. Such a condensed layer contains a small amount of water evaporated together with IPA at the surface of the article to be dried (W). Accordingly, if the operation of the vapor drying apparatus is continued, the water concentration in IPA stored in the vapor generating section will increase due to recycling from the condensed layer 708 to the vapor generating section 702.

However, a part of IPA of the vapor generating section 702 is introduced into the line 717 extending from the membrane module unit 710a to the membrane module unit 710b via the line 713. Namely, IPA having a low water concentration introduced from the vapor generating section 702 of the treating tank 701 is combined to IPA having a low water concentration, which is the non-permeated liquid separately purified by the membrane module unit 710a. The combined IPA is heated by a heater (not shown), as the case requires, and then sent to a supply line of the membrane module unit 710b on the downstream side.

In the membrane module unit 710b, water contained in IPA is selectively pervaporated by hollow fiber membranes in the same manner as in the first membrane module unit, and the water concentration of the introduced IPA is further reduced. IPA thus further purified by the second membrane module unit 710b will then be returned to the vapor generating section 702 via the line 716 and will then be used again as the drying liquid.

Namely, in the above described vapor drying apparatus, in the first membrane module unit 710a, IPA (condensed liquid) collected by the first receiving section 705 is introduced at a high water concentration without being combined with IPA having a low water concentration (drying liquid), whereby the difference between the water partial pressure at the primary side of the membrane and the water partial pressure at the secondary side can be made large, and high separation efficiency can be obtained. To the respective membrane module units 710a and 710b, the condensed liquid and the drying liquid are separately introduced, whereby the treating amount in each of the membrane module units 710a and 710b will be reduced. In other words, it is possible to improve the operation efficiency of the membrane module units 710a and 710b as compared with a case where both IPA having a high water concentration (condensed liquid) and IPA having a low water concentration are introduced all together to the module units.

The IPA concentration in the liquid to be treated in each line of the above embodiment is, for example, as follows.

TABLE 1

| Line | IPA concentration % in the liquid to be treated (water concentration %) |
| --- | --- |
| Line 711 | 95.0 (5.0) |
| Line 713 | 99.5 (0.5) |
| Line 717 | 99.0 (1.0) |
| Line 716 | 99.9 (0.1) |

Now, another embodiment of the vapor drying apparatus of the present invention will be described.

As shown in FIG. 8, in this embodiment, the vapor drying apparatus comprises a treating tank 701 for carrying out drying by condensing vapor of a drying liquid comprising an organic solvent as the main component, on the surface of the article to be dried (W) after washing with water and a plurality of membrane module units 710a and 710b consti-tuted by membranes which selectively permeate water. The treating tank 701 is provided, in its interior, with a section 702 for generating vapor of the drying liquid, a dry space section 704 for placing the article to be dried (W), a first receiving section 705 for collecting a condensed liquid below the dry space section, a cooling coil 706 for condensing the vapor of the drying liquid above the dry space section 704, and a second receiving section 707 for collecting a condensed liquid below the cooling coil.

The first membrane module unit 710a is provided with a line 711 for introducing the condensed liquid from the first receiving section 705 to the first membrane module unit via a first feed material tank (not shown). The membrane module unit 710b located on the downstream side of the first membrane module unit 710a, is provided with a line 712 for introducing the condensed liquid from the second receiving section 707 to the second membrane module unit 710b via a second feed material tank 712A. On the outlet side of the final membrane module unit 710b, a line 716 for introducing the non-permeated liquid to the vapor generating section 702, is provided.

This embodiment differs from the previous embodiment in that the second receiving section 707 for collecting the condensed liquid below the cooling coil 706, is provided, and the line 712 for introducing the condensed liquid collected by the second receiving section 707 to the second membrane module unit 710b, is provided.

The second receiving section 707 is provided in the form of a gutter along the inner wall of the treating tank 701. This is provided taking into consideration the fact that the condensed liquid condensed by the cooling coil 706 and dropped from the cooling coil is large in amount and low in the water concentration as compared with the condensed liquid collected by the receiving section 705 and it is high in the water concentration as compared with IPA in the vapor generating section 702. Accordingly, by introducing such a condensed liquid to the membrane module unit 710b via the line 712, it is possible to improve the operation efficiency of the membrane module units 710a and 710b in the same manner as in the previous embodiment.

Namely, in the vapor drying apparatus of this embodiment, in the first membrane module unit 710a, the condensed liquid from the first receiving section 705 is introduced at a high water concentration without being mixed with the condensed liquid from the second receiving section 707, whereby the difference between the water partial pressure at the primary side of the membrane and the water partial pressure of the secondary side can be made large, and a high separation efficiency can be obtained. Further, to the respective membrane module units 710a and 710b, these condensed liquids are separately introduced, whereby the treating amount in each of the membrane module units 710a and 710b will be reduced.

The IPA concentration of the liquid to be treated in each line of this embodiment is, for example, as follows.

TABLE 2

| Line | IPA concentration % in the liquid to be treated (water concentration %) |
| --- | --- |
| Line 711 | 95.0 (5.0) |
| Line 712 | 99.0 (1.0) |
| Line 717 | 99.0 (1.0) |
| Line 716 | 99.9 (0.1) |

Now, still another embodiment of the vapor drying apparatus of the present invention will be described.

As shown in FIG. 9, the membrane module unit 710b provided with the line 712 for introducing the condensation liquid from the second receiving section 707 as in the previous embodiment or the membrane module unit 710c located on the downstream side of the membrane module unit 710b, is provided with a line 713 for introducing a part of the drying liquid from the vapor generating section 702. The line 713 is usually connected to the membrane module unit 710c located at the most downstream side.

In the embodiment shown in FIG. 9, three membrane module units 710a, 710b and 710c are sequentially connected in the same manner as the previous embodiment. Here, the membrane module unit 710b and the membrane module unit 710c are connected by a line 718. The membrane module unit 710c is provided with a discharge line 719 for discharging water permeated to the secondary side of the membrane. In the same manner as in the embodiment shown in FIG. 7, the line 718 is usually provided with a pump for transporting the liquid and a heater for heating the liquid to be treated, and the discharge line 719 is provided with a cold trap and a vacuum pump. Other constructions are the same as in the previous embodiment.

Specifically, the above lines 711, 712 and 713 distribute the condensed liquid from the first receiving section 705, the condensed liquid from the second receiving section 707 and the drying liquid from the vapor generation section 702 to the membrane module units 710a, 710b and 710c, respectively, based on the respective water concentrations. The liquids having higher water concentrations are introduced to the module units at the upperstream side. By such a construction, it is possible to improve the operation efficiency of the respective membrane module units 710a, 710b and 710c in the same manner as in the previous embodiments.

Namely, in the vapor drying apparatus of this embodiment, in the first membrane module unit 710a, the condensed liquid from the receiving section 705 is introduced at a high water concentration without being mixed with the condensation liquid from the receiving section 707 or with the drying liquid from the vapor generating section 702, whereby the difference between the water partial pressure at the primary side of the membrane and the water partial pressure at the secondary side can be made large, and a high separation efficiency can be obtained. Further, to the second membrane module unit 710b or to the membrane module unit 710c located on the downstream side of the membrane module unit 710b, the purified condensed liquid from the receiving section 705 and the condensed liquid from the receiving section 707 are introduced without being mixed with the drying liquid having a low water concentration from the vapor generating section 702, whereby high separation efficiency can be obtained. To the respective membrane module units 710a, 710b and 710c, the respective condensed liquids and the drying liquid are separately introduced, whereby the treating amount in each of the membrane module units 710a, 710b and 710c will be reduced as compared with a case where the respective condensed liquids and the dry liquid are all together introduced to the first membrane module unit 710a.

The IPA concentration in the liquid to be treated in each line of this embodiment is, for example, as follows.

TABLE 3

| Line | IPA concentration % in the liquid to be treated (water concentration %) |
|---|---|
| Line 711 | 95.0 (5.0) |
| Line 712 | 99.0 (1.0) |
| Line 713 | 99.6 (0.4) |
| Line 716 | 99.95 (0.05) |
| Line 717 | 99.0 (1.0) |
| Line 718 | 99.9 (0.1) |

In the present invention, when at least three membrane module units are used, and the water concentrations at the respective inlets are close to the water concentrations of the liquids to be introduced for treatment, it is preferred to introduce the liquids having water concentrations close to the respective membrane module units.

For example, in the embodiment shown in FIG. 9, the condensed liquid of the first receiving section 705 having the highest water concentration is introduced to the first membrane module unit 710a; the condensed liquid of the second receiving section 707 having a water concentration next to the highest is introduced to the second membrane module unit 710b which is located on the downstream side of the first membrane module unit and the water concentration at the inlet of which is close to the water concentration in the condensed liquid of the second receiving section 707; and IPA of the vapor generating section 702 having the lowest water concentration is introduced to the third membrane module unit 710c, the water concentration at the inlet of which is close to the water concentration in the IPA of the vapor generating section 702.

Thus, according to the preferred embodiment of the present invention, even when the condensed liquid of the second receiving section 707 having a low water concentration or the drying liquid of the vapor generating section 702 is introduced to the membrane module, the water concentration in the non-permeated liquid resulting from the first receiving section 705 will not substantially change, and introduction of such a drying liquid or the like to the membrane module unit is negligible from the viewpoint of the concentration. In other words, unnecessary pervaporation treatment in each of the membrane module units 710a, 710b and 710c can be avoided, whereby the load for treatment is reduced. Thus, it is possible to improve the operation efficiency of the membrane module units 710a, 710b and 710c.

What is claimed is:

1. A vapor drying apparatus for carrying out drying by condensing vapor of a drying liquid comprising an organic solvent as the main component, on the surface of the article to be dried, said apparatus comprising a treating tank for generating the vapor of the drying liquid and condensing the vapor of the drying liquid on the surface of the article to be dried and a liquid separating apparatus comprising a plurality n of pervaporation membrane module units for purifying a liquid to be treated, a supply line connected to said pervaporation membrane module units for supplying the liquid to be treated to the membrane module units, a withdrawing line for withdrawing the permeated fluid from the membrane module units and a withdrawing line for withdrawing the non-permeated liquid, wherein said supply line is provided with a pressure pump for transporting the liquid and a heater, and a final withdrawing line for the non-permeated liquid of a final one of the membrane module units is provided with a pressure regulating valve, the plurality of pervaporation membrane module units being connected so that the non-permeated liquid of a first stage pervaporation membrane module unit is supplied to the second stage pervaporation membrane module unit, and the non-permeated liquid of an n–1 stage pervaporation membrane module unit is supplied to the n stage pervaporation membrane module unit; wherein said treating tank is provided, in its interior, with a section for generating the vapor of the drying liquid, a dry space section for placing the article to be dried, and a receiving section for collecting a condensed liquid below the dry space section; the first stage pervaporation membrane module unit is provided with the supply line for supplying the condensed liquid from said receiving section; at least one of the second and subsequent stage pervaporation membrane module units is provided with a line for supplying a part of the drying liquid from said vapor generating section; and the non-permeated liquid withdrawing line of the final pervaporation membrane module unit is provided with a line for introducing the non-permeated liquid to said vapor generating section.

2. A vapor drying apparatus for carrying out drying by condensing vapor of a drying liquid comprising an organic solvent as the main component, on the surface of the article to be dried, said apparatus comprising a treating tank for generating the vapor of the drying liquid and condensing the vapor of the drying liquid on the surface of the article to be dried and a liquid separating apparatus comprising a plurality n of pervaporation membrane module units for purifying a liquid to be treated, a supply line connected to said pervaporation membrane module units for supplying the liquid to be treated to the membrane module units, a withdrawing line for withdrawing the permeated fluid from the membrane module units and a withdrawing line for withdrawing the non-permeated liquid, wherein said supply line is provided with a pressure pump for transporting the liquid and a heater, and a final withdrawing line for the non-permeated liquid of a final one of the membrane module units is provided with a pressure regulating valve, the plurality of pervaporation membrane module units being connected so that the non-permeated liquid of a first stage pervaporation membrane module unit is supplied to the second stage pervaporation membrane module unit, and the non-permeated liquid of the n–1 stage pervaporation membrane module unit is supplied to the n stage pervaporation membrane module unit; wherein said treating tank is provided, in its interior, with a section for generating the vapor of the drying liquid, a dry space section for placing the article to be dried, a first receiving section for collecting a condensed liquid below the dry space section, a cooling coil for condensing the vapor of the drying liquid above the dry space section, and a second receiving section for collecting a condensed liquid below the cooling coil; the first stage pervaporation membrane module unit is provided with the supply line for supplying the condensed liquid from the first receiving section; at least one of the second and subsequent pervaporation membrane module units is provided with a line for supplying the condensed liquid from the second receiving section; and the non-permeated liquid withdrawing line of the final pervaporation membrane module unit is provided with a line for introducing the non-permeated liquid to said vapor generating section.

3. A vapor drying apparatus for carrying out drying by condensing vapor of a drying liquid comprising an organic solvent as the main component, on the surface of an article to be dried, said apparatus comprising a treating tank for generating the vapor of the drying liquid and condensing the vapor of the drying liquid on the surface of the article to be dried, and a liquid separating apparatus comprising a plurality n of pervaporation membrane module unite for purifying a liquid to be treated, a supply line connected to said pervaporation membrane module units for supplying the liquid to be treated to the membrane module units, a withdrawing line for withdrawing the permeated fluid from the membrane module units and a withdrawing line for withdrawing the non-permeated liquid, wherein said supply line is provided with a pressure pump for transporting the liquid and a heater, and a final withdrawing line for the non-permeated liquid of a final one of the membrane module units is provided with a pressure regulating valve, further comprising a feed material tank for preliminarily storing the liquid to be treated, wherein a line for returning the non-permeated liquid to said feed material tank is connected to the withdrawing line for the non-permeated liquid via a switchover valve; a feed material tank liquid level detector for detecting the liquid level of the liquid to be treated provided in said feed material tank; and a control means is provided for opening said switchover valve to said line for returning the non-permeated liquid to the feed material tank when the liquid level in the feed material tank becomes lower,than a predetermined level, or opening said switchover valve to said withdrawing line for the non-permeated liquid when the liquid level becomes higher than the predetermined level, depending upon the input signal from said feed material tank liquid level detector, wherein the plurality of pervaporation membrane module units are connected so that the non-permeated liquid of a first stage pervaporation membrane module unit is supplied to the second stage pervaporation membrane module unit, and the non-permeated liquid of the n–1 stage pervaporation membrane module unit is supplied to the n stage pervaporation membrane module unit, wherein said treating tank is provided, in its interior, with a section for generating the vapor of the drying liquid, a dry space section for placing the article to be dried, and a receiving section for collecting a condensed liquid below said dry space section; a line is provided for transporting the condensed liquid from the receiving section to the feed material tank; the first stage pervaporation membrane module unit is provided with the supply line for supplying the condensed liquid from the feed material tank; at least one of the second and subsequent stage pervaporation membrane module units is provided with a line for supplying a part of the drying liquid from said vapor generating section; connected via a switchover valve to the non-permeated liquid withdrawing line of the final pervaporation membrane module unit, a line is provided for returning the non-permeated liquid to the feed material tank and a line for returning the non-permeated liquid to the vapor generating section of the treating tank; the feed material tank is equipped with a feed material tank liquid level detector for detecting the liquid level of the liquid to be treated; and a control means is provided for opening the switchover valve to the line for returning the non-permeated liquid to the feed material tank when the liquid level in the feed material tank becomes lower than a predetermined level, or opening the switchover valve to the line for returning the non-permeated liquid to the vapor generating section of the treating tank when the liquid level becomes higher than the predetermined level, depending upon the input signal from the feed material tank liquid level detector.

4. A vapor drying apparatus for carrying out drying by condensing vapor of a drying liquid comprising an organic solvent as the main component, on the surface of an article to be dried, said apparatus comprising treating tank for generating the vapor of the drying liquid and condensing the vapor of the drying liquid on the surface of the article to be dried, and a liquid separating apparatus comprising a plurality of n of pervaporation membrane module units for purifying a liquid to be treated, a supply line connected to said pervaporation membrane module units for supplying the liquid to be treated to the membrane module units, a withdrawing line for withdrawing the permeated fluid from the membrane module units and a withdrawing line for withdrawing the non-permeated liquid, wherein said supply line is provided with a pressure pump for transporting the liquid and a heater, and a final withdrawing line for the non-permeated liquid of a final one of the membrane module units is provided with a pressure regulating valve, said apparatus including a feed material tank for preliminarily storing the liquid to be treated and a distillation still for distilling the non-permeated liquid; wherein a line for returning the nonpermeated liquid to said feed material tank is connected via a switchover valve to a line for transporting the liquid from the final pervaporation membrane module unit to the distillation still; an on-off valve is provided in a withdrawing line for the distilled liquid; a feed material tank liquid level detector for detecting the liquid level of the liquid to be treated, is provided in said feed material tank; a distillation still liquid level detector for detecting the liquid level of the liquid to be distilled, is provided in said distillation still; a control means is provided for opening said switchover valve to said line for returning the non-permeated liquid to the feed material tank when the liquid level in the feed material tank becomes lower than a predetermined level, or opening said switchover valve to said line for transporting the liquid to the distillation still when the liquid level becomes higher than the predetermined level, depending upon the input signal from said feed material tank liquid level detector; and a control means provided for closing said on-off valve when the liquid level of the liquid to be distilled in said distillation still becomes lower than a predetermined level, or opening said on off valve when the liquid level becomes higher than the predetermined level, depending upon the input signal from said distillation still liquid level detector, wherein the plurality of pervaporation membrane module units are connected so that the nonpermeated liquid of a first stage pervaporation membrane module unit is supplied to the second stage pervaporation membrane unit, and the non-permeated liquid of the n−1 stage pervaporation membrane module unit is supplied to the n stage pervaporation membrane module unit; wherein said treating tank is provided, in its interior, with a section for generating the vapor of the drying liquid, a dry space section for placing the article to be dried, and a receiving section for collecting a condensed liquid below said dry space section; a line provided for transporting the condensed liquid from the receiving section to the feed material tank; the first stage pervaporation membrane module unit is provided with a line for supplying the condensed liquid from the feed material tank; at least one of the second and subsequent stage pervaporation membrane module units is provided with a line for supplying a part of the drying liquid from said vapor generating section; connected by a switchover valve to the non-permeated liquid withdrawing line of the final pervaporation membrane module unit, a line is provided for returning the non-permeated liquid to the feed material tank and a line for transporting the non-permeated liquid to the distillation still; a line connected via an on-off valve to the distillation still for returning the distilled liquid to the vapor generating section of the treating tank; the distillation still is equipped with a distillation still liquid level detector for detecting the liquid level of the liquid to be distilled; a control means is provided for opening the switchover valve to the line for returning the non-permeated liquid to the feed material tank when the liquid level in the feed material tank becomes lower than a predetermined level, or opening the switchover valve to the line for transporting the non-permeated liquid to the distillation still when the liquid level becomes higher than the predetermined level, depending upon the input signal from the feed material tank liquid level detector; and a control means is provided for closing the on-off valve when the liquid level of the liquid to be distilled in the distillation still becomes lower than a predetermined level, or opening the on-off valve when the liquid level becomes higher than the predetermined level, depending upon the input signal from the distillation still liquid level detector.

5. A vapor drying apparatus for carrying out drying by condensing vapor of a drying liquid comprising an organic solvent as the main component, on the surface of an article to be dried, said apparatus comprising:

a treating tank having means for generating the vapor of the drying liquid and condensing the vapor of the drying liquid on the surface of the article to be dried, wherein said treating tank has a section for generating the vapor of the drying liquid, a dry space section for the article to be dried and a receiving section for collecting a condensed liquid below the dry space section;

a liquid separating apparatus comprising a plurality n of pervaporation membrane module units for purifying a liquid to be treated, wherein the plurality of pervaporation membrane module units are connected so that non-permeated liquid of a first stage of the pervaporation membrane module units is supplied to a second stage of the pervaporation membrane module units, and non-permeated liquid of an n−1 stage of the pervaporation membrane module units is supplied to the n stage of the pervaporation membrane module units;

a supply line for supplying the condensed liquid from said receiving section to the first stage pervaporation membrane module unit;

a first withdrawing line for withdrawing the permeated fluid from the membrane module units;

a second withdrawing line for withdrawing the non-permeated liquid from the membrane module units; and a line for supplying a part of the drying liquid from said vapor generating section to at least one of the second and subsequent stage pervaporation membrane module units, wherein the second liquid withdrawing line of the final pervaporation membrane module unit is connected for introducing the non-permeated liquid from the final pervaporation membrane module unit to said vapor generating section.

6. A vapor drying apparatus for carrying out drying by condensing vapor of a drying liquid comprising an organic solvent as the main component, on the surface of an article to be dried, said apparatus comprising:

a treating tank having means for generating the vapor of the drying liquid and condensing the vapor of the drying liquid on the surface of the article to be dried, wherein said treating tank has a section for generating the vapor of the drying liquid, a dry space section for the article to be dried, a first receiving section for collecting a condensed liquid from the dry space section, a cooling coil for condensing the vapor of the drying liquid and a second receiving section for collecting a condensed liquid from the cooling coil;

a liquid separating apparatus comprising a plurality n of pervaporation membrane module units for purifying a liquid to be treated, wherein the plurality of pervaporation membrane module units are connected so that non-permeated liquid of a first stage of the pervaporation membrane module units is supplied to a second stage of the pervaporation membrane module units, and non-permeated liquid of an n−1 stage of the pervaporation membrane module units is supplied to the n stage of the pervaporation membrane module units;

a supply line for supplying the condensed liquid from said first receiving section to the first stage pervaporation membrane module unit;

a first withdrawing line for withdrawing the permeated fluid from the membrane module units;

a second withdrawing line for withdrawing the non-permeated liquid from the membrane module units; and a line for supplying a part of the drying liquid from at least one of said vapor generating section and said second receiving section to at least one of the second and subsequent stage pervaporation membrane module units, wherein the second liquid withdrawing line of the final pervaporation membrane module unit is connected for introducing the non-permeated liquid from the final pervaporation membrane module unit to said vapor generating section.

7. A vapor drying apparatus for carrying out drying by condensing vapor of a drying liquid comprising an organic solvent as the main component, on the surface of the article to be dried, which comprises a treating tank for generating the vapor of the drying liquid and condensing the vapor of the drying liquid on the surface of the article to be dried and a liquid separating apparatus comprising a plurality n of pervaporation membrane module units for purifying a liquid to be treated, a supply line connected to said pervaporation membrane module units for supplying the liquid to be treated to the membrane module units, a withdrawing line for withdrawing the permeated fluid from the membrane module units and a withdrawing line for withdrawing the non-permeated liquid, wherein said supply line is provided with a pressure pump for transporting the liquid and a heater, and a final withdrawing line for the non-permeated liquid of a final one of the membrane module units is provided with a pressure regulating valve, wherein the pervaporation membrane module units each comprises a pervaporation membrane module, a recycling line for recycling a part or all of the non-permeated liquid to the feed material side of the separating membrane, a recycling pump provided at an intermediate point of the recycling line, said plurality of pervaporation membrane module units connected so that the non-permeated liquid of a first stage pervaporation membrane module unit is supplied to the second stage pervaporation membrane module unit, and the non-permeated liquid of the n-I stage pervaporation membrane module unit is supplied to the n stage pervaporation membrane module unit, and in each membrane module unit, said feed material supply line and said non-permeated liquid withdrawing line are connected to a suction side of the recycling pump, and the non-permeated liquid withdrawing line is connected to an upperstream side of the feed material supply tank, wherein said treating tank is provided, in its interior, with a section for generating the vapor of the drying liquid, a dry space section for placing the article to be dried, and a receiving section for collecting a condensed liquid below the dry space section; the first stage pervaporation membrane module unit is provided with the supply line for supplying the condensed liquid from said receiving section; at least one of the second and subsequent stage pervaporation membrane module units, is provided with a line for supplying a part of the drying liquid from said vapor generating section; and the non-permeated liquid withdrawing line of the final pervaporation membrane module unit is provided with a line for introducing the non-permeated liquid to said vapor generating section.

8. A vapor drying apparatus for carrying out drying by condensing vapor of a drying liquid comprising an organic solvent as the main component, on the surface of the article to be dried, which comprises a treating tank for generating the vapor of the drying liquid and condensing the vapor of the drying liquid on the surface of the article to be dried and a liquid separating apparatus comprising a plurality n of pervaporation membrane module units for purifying a liquid to be treated, a supply line connected to said pervaporation membrane module units for supplying the liquid to be treated to the membrane module units, a withdrawing line for withdrawing the permeated fluid from the membrane module units and a withdrawing line for withdrawing the non-permeated liquid, wherein said supply line is provided with a pressure pump for transporting the liquid and a heater, and a final withdrawing line for the non-permeated liquid of a final one of the membrane module units is provided with a pressure regulating valve, wherein the pervaporation membrane module units each comprises a pervaporation membrane module, a recycling line for recycling a part or all of the non-permeated liquid to the feed material side of the separating membrane, a recycling pump provided at an intermediate point of the recycling line, said pervaporation membrane module units which are connected so that the non-permeated liquid of a first stage pervaporation membrane module unit is supplied to the second stage pervaporation membrane module unit, and the non-permeated liquid of the n−1 stage pervaporation membrane module unit is supplied to the n stage pervaporation membrane module unit, and in each membrane module unit, said feed material supply line and said non-permeated liquid withdrawing line are connected to a suction side of the recycling pump, and the non-permeated liquid withdrawing line is connected to an upperstream side of the feed material supply line; wherein said treating tank is provided, in its interior, with a section for generating the vapor of the drying liquid, a dry space section for placing the article to be dried, a first receiving section for collecting a condensed liquid below the dry space section, a cooling coil for condensing the vapor of the drying liquid above the dry space section, and a second receiving section for collecting a condensed liquid below the cooling coil; the first stage pervaporation membrane module unit is provided with the supply line for supplying the condensed liquid from the first receiving section; at least one of the second and subsequent pervaporation membrane module units is provided with a line for supplying the condensed liquid from the second receiving section; and the non-permeated liquid withdrawing line of the final pervaporation membrane module unit is provided with a line for introducing the non-permeated liquid to said vapor generating section.

\* \* \* \* \*